Nov. 12, 1929. E. FULPIUS 1,735,315
THRUST BEARING
Filed Sept. 1, 1921 2 Sheets-Sheet 1

Inventor:
E. Fulpius
By Lawrence Langner
Attorney

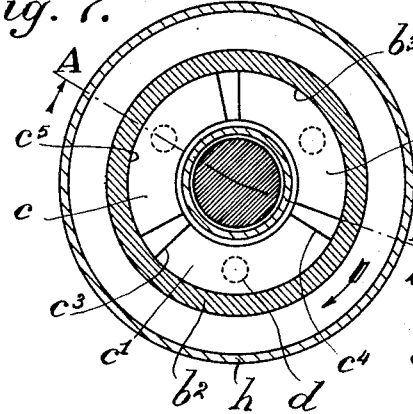
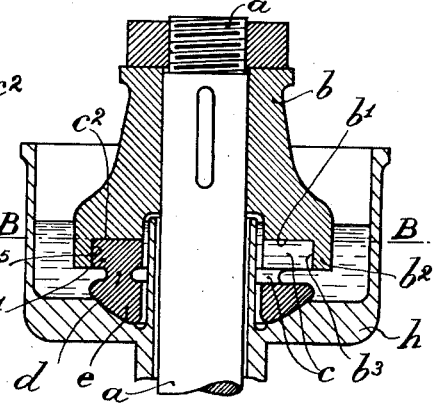
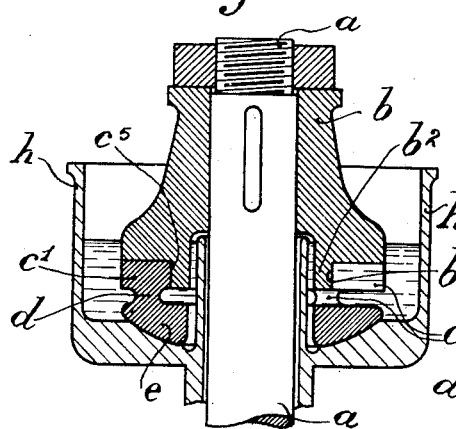
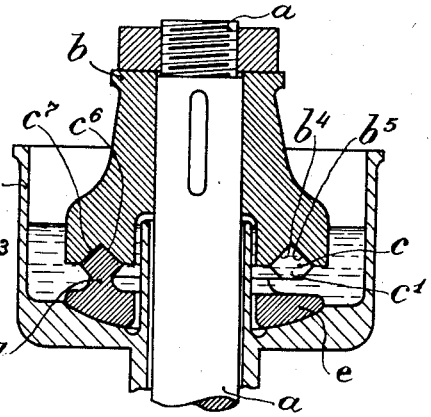
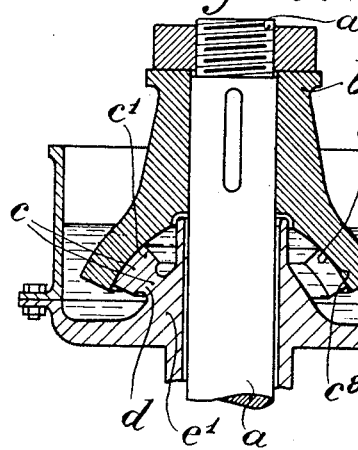
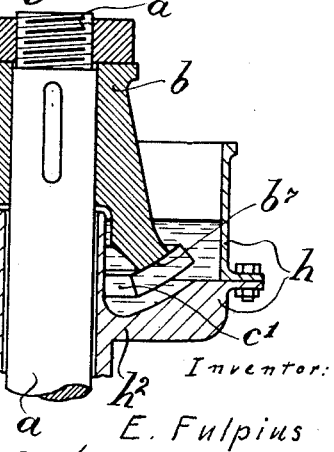

Patented Nov. 12, 1929

1,735,315

UNITED STATES PATENT OFFICE

EDMOND FULPIUS, OF GENEVA, SWITZERLAND, ASSIGNOR OF ONE-HALF TO ALLIS-CHALMERS MANUFACTURING COMPANY, OF MILWAUKEE, WISCONSIN, A CORPORATION OF DELAWARE

THRUST BEARING

Application filed September 1, 1921, Serial No. 497,520, and in Switzerland December 23, 1916.

(GRANTED UNDER THE PROVISIONS OF THE ACT OF MARCH 3, 1921, 41 STAT. L., 1313)

The present invention relates to a thrust bearing for a shaft adapted to support a great axial thrust without resort to a pump for supplying lubricant between the rubbing surfaces of the bearing elements.

The thrust bearing and the shaft are each provided with an annular member or plate receiving the thrust. The one member preferably is rigid and practically unyielding and presents a smooth and uninterrupted, continuous surface, while the other member is not absolutely rigid and is capable of yielding and has a rubbing surface which is interrupted and divided into a plurality of sections or shoes which terminate, at points adjacent the rubbing surface of the rigid member, in parts adapted to slightly yield under the action of the thrust or load, in order to leave a certain space between the surface of these sections and the surface of the first unyielding member for the purpose of allowing the lubricant to penetrate and to be taken along by the rotary movement of the shaft when the latter exerts a pressure opposite to that produced by the axial thrust.

It may be acknowledged that there are already thrust bearings known which are adapted to support a great axial strain without the lubricant acting between the rubbing surfaces of the bearing and the shaft, being supplied under pressure by means of a pump. But in such known constructions one or the other of the two members receiving the axial thrust has substituted therefor a number of parts independent of one another or in which the annular members are provided with a plurality of radial grooves for the lubrication and presents slightly inclined surfaces which are obtained by a corresponding machining of the piece in manufacture, said inclined surfaces receding from each groove.

According to the present invention the same result is obtained with the utmost simplicity and less machining of the parts than is required in the case of formerly known thrust bearings.

An object of the present invention is to provide an improved design and construction of bearing embodying cooperative bearing elements and wherein a portion of one of the bearing elements is yieldable to permit lubricating material to be carried between the opposed bearing surfaces of the cooperative bearing elements.

A further object of this invention is to provide an improved design and construction of thrust bearing embodying cooperative bearing elements and wherein one of the bearing elements comprises a support and a bearing shoe carried by the support and integral therewith, one portion of the shoe being yieldable to a different degree than another portion thereof.

These and other objects and advantages are secured by this invention, various novel features of which will be apparent from the description and drawings, disclosing several embodiments of the invention, and will be more particularly pointed out in the claims.

In the accompanying drawings:

Fig. 6 is a vertical section of a third form on the broken lines A—A of Fig. 7.

Fig. 7 is a horizontal section on the lines B—B of Fig. 6.

Figs. 8, 9, 10 and 11 are vertical sections of other working forms.

Figure 13:
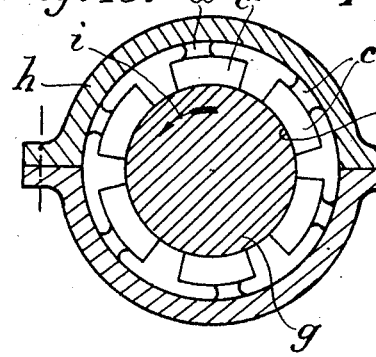

Fig. 13 a cross section of a shaft and the thrust bearing according to another form.

The vertical shaft $a$ (Fig. 1) is subjected to an axial thrust from the top to the bottom and is provided with a collar $b$ which constitutes one of the annular members or plates mentioned above and revolves together with the shaft and to which the thrust is transmitted. The collar $b$ presents an annular bottom surface $b^1$ which is quite smooth and practically unyielding and through which surface the collar $b$ rests upon the said second annular member or plate. This latter which is made in one piece, presents towards the bottom face of the collar $b$ three interruptions so that three parts $c$ of equal dimensions are made, each comprising a section or shoe $c^1$ whose bearing face $c^2$ is in contact with $b^1$. Each one of the said sections is provided with a supporting column $d$ of circular cross section connecting the segment $c^1$ with an annular unyielding bottom part $e$ of the said second member, this part $e$ being in the form of a relatively stiff annular supporting collar. The column of each segment or shoe has a comparatively small cross section and is located eccentric, with regard to the projection upon it in an axial direction, of the center of the active bearing surface of the segment. The bottom part $e$, here shown as spherical, is lodged in a correspondingly shaped cup or housing $h$ which is traversed by the shaft which passes through the guiding bushing $g$. The housing $h$ is sufficiently high to keep the level of the oil necessary for lubrication constantly above the surfaces $b^1$, $c^2$ to be lubricated.

Figures 4, 5:
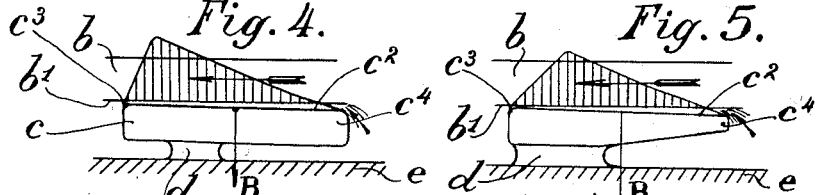
Fig. 4 shows diagrammatically the deflection of the sections or shoes of the first working form and the distribution of the pressure of the oil between the supporting surfaces when the shaft is rotating.
Fig. 5 shows diagrammatically the deflection of portions of the sections or shoes of the second working form as represented in Fig. 3.

The axial thrust to which the shaft $a$ is submitted is transmitted from the collar $b$ to the sections or shoes $c$ by means of the thin coat or film of oil between surfaces $c^2$ and $b^1$. Since the columns $d$ are of comparatively small cross section as compared with that of the shoes $c^1$ and since they are located outside of the centers of the rubbing surfaces $c^2$ of the latter, they will yield slightly under the effect of this thrust while the shoes incline downwards from $c^3$ to $c^4$ on the leading side thereof, that is, where a point on the collar $b$ first arrives above each shoe in the course of rotation of the collar, as shown in Fig. 4 and indicated by the arrow in Fig. 7. The oil which is, so to say, squeezed or forced between the shoes $c^1$ and the rubbing surface $b^1$ will be taken along in the direction of the rotary movement of the shaft $a$, and this film of oil intermediate the bearing surfaces exerts a thrust or resistance towards the upper part $b^1$, and therefore will produce between the rubbing or bearing surfaces $b^1$, $c^2$ a pressure balancing the thrust R exercised from above upon the shoe, this balancing pressure being greater as the rotary speed increases. The value of this pressure varies along the segment in the manner indicated by the vertically hatched triangle in Fig. 4.

Figure 3:
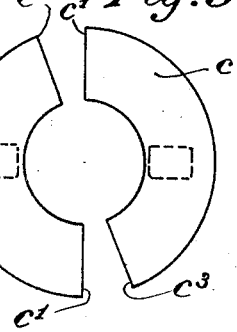
Fig. 3 is a detail view of a modified form.

In accordance with Fig. 3 there are only two sections or shoes and their supporting columns are of rectangular cross section.

In Fig. 5, there is shown diagrammatically the position or condition of a shoe of the general type of that described hereinabove in connection with Fig. 3, and wherein a substantial deflection of the portion of the shoe at the leading side thereof is utilized for developing a wedge-shaped film of oil under pressure between the shoe and the rotating bearing collar, the flexure of one of the shoes being represented as the shaft is rotating, as well as the value of the pressure of the oil along this shoe.

The number of the shoes and the form of the columns may be varied at will.

In modifying the relative dimensions of the shoe $c^1$ and the column as well as the position of the latter, one is free to make the design or dimensions such that the deflection, instead of taking place in the column alone, practically takes place in the shoe $c^1$, or in other words that the deflection in the column is quite insensible or inappreciable in comparison to that of the shoe, or the dimensions may be chosen in such a way that the deflection takes place simultaneously in both parts.

According to the working form shown in Figs. 6 and 7 the collar $b$ is provided on its lower part with a rim $b^2$ whose inner surface $b^3$ is in contact with the exterior surfaces $c^5$ of the shoes $c^1$ which are in the general form of portions of segments or sectors, these surfaces $b^3$, $c^5$ having the form of portions of cylinders of the same diameter. The surfaces $b^3$, $c^5$ secure or insure the lateral guiding of the shaft $a$, a feature which permits doing away with special guide bushings, such as are indicated at $g$ in the working form shown in Fig 1.

In the fourth working form (Fig. 8) the annular rim $b^2$ is located near the axis of the collar $b$ and its cylindrical outer surface $b^3$ is in contact with the cylindrical inner surfaces $c^5$ of the shoes $c^1$ in order to guide the shaft laterally.

According to Fig. 9, the shoes, in vertical cross section, have a shape at their upper part quite like that of isosceles triangles, their bearing surfaces $c^6$, $c^7$ being inclined to each other and in contact with two continuous correspondingly inclined surfaces $b^4$, $b^5$ of the collar $b$. In this case the surfaces $c^6$, $c^7$, $b^4$, $b^5$ constitute simultaneously the bearing or rubbing surfaces and the surfaces for laterally guiding the shaft.

The cross section of the shoes $c^1$ may have a shape other than that of isosceles triangles.

In the working form shown in Fig. 10 the bottom part $e^1$ is made in one piece with both the bottom $h^2$ of the cup or housing $h$ and the portions $c$, the shoes $c^1$ of the portions $c$ being provided with outer surfaces $c^8$ in the shape of portions of spherical zones and being in contact with a continuous lower surface $b^6$ of the collar $b$, in the shape of a hollow spherical calotte. The surfaces $c^8$ and $b^6$ constitute therefore simultaneously the bearing or rubbing surfaces and the surfaces serving for the guiding of the shaft $a$.

The annular portion $h^1$ of the housing is united to the bottom $h^2$ by means of ribs and bolts.

In the working form as represented in Fig. 11 the shoes $c^1$ are provided with hollow inner surfaces $c^9$ in the shape of portions of spherical zones and the collar $b$ is likewise provided with a protruding continuous surface $b^7$ in the shape of a spherical zone.

Figure 1:
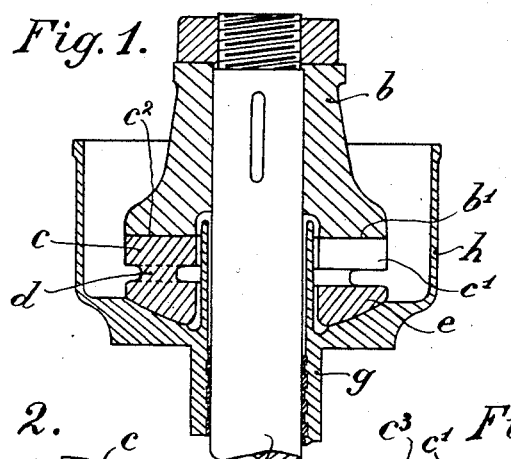
Fig. 1 is a vertical section.
Figure 2:
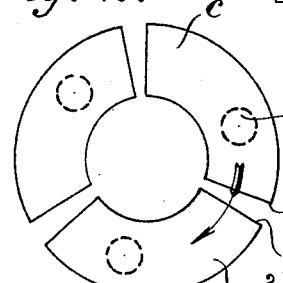
Fig. 2 is a detail view.

By modifying the relative dimensions of the segment $c^1$ and of the column $d$ as well as the position of the latter, one is able, the same as with the working form according to Fig. 1, to cause the deflection to take place in either part or in both of them simultaneously.

Where a separate annular bottom part or piece $e$ is used, it may rest on the cup or housing $h$ along either a plane or a spherical surface, as indicated in Fig. 1.

The collar $b$ may have substituted therefor any other rigid and unyielding member.

The member which is carried along by the rotation of the shaft may be that which presents an uninterrupted and unyielding surface or that which comprises the shoes. These latter may have bearing surfaces, portions of which may be made replaceable or interchangeable.

Of course it is not necessary that the shaft be vertical, and the thrust bearing and the shaft may be arranged, just as the bearing shown in Fig. 1, in order to receive the axial thrust in both directions.

Figure 12:
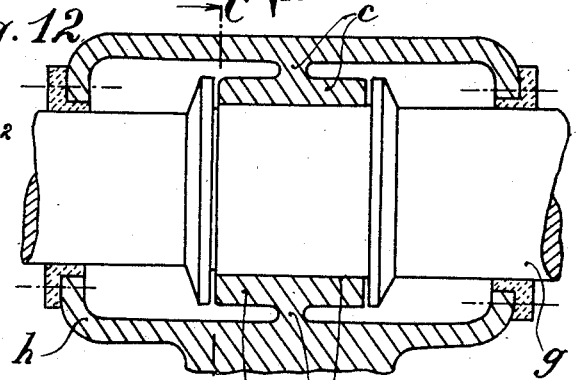
Fig. 12 is a longitudinal section.

A working form analogous to that shown in Fig. 1 is represented in Figs. 12 and 13, this form being suited to the case where the shaft receives no axial thrust at all but only a transverse thrust. The horizontal shaft $g$, which receives no axial thrust and which corresponds by way of analogy to the annular member $b$ shown in Fig. 1 passes into the sheath or housing $h$ which is made in one piece or integral with a crown constituting the second annular member, which surrounds the shaft and which is provided on the face towards the latter with six interruptions of such a form that six identical parts $c$ are obtained. Each of these comprises a shoe $c^1$, the shoes concentrically encircling the shaft $g$ and in contact with the latter at $c^2$, and also a column $d$ connecting the shoe or segment to the casing or housing $h$ which constitutes the unyielding base part. The column $d$ is located eccentrically and is disposed towards the rear extremity of the shoe, that is, the edge which the shaft $g$ reaches last when rotating.

If the shaft $g$ rotates in the direction shown by the arrow $i$, the oil which is carried along is squeezed between the surface of the shaft and the surfaces $c^2$ of the segments which yield so that the leading edge or extremity thereof is further removed from the shaft than the trailing edge or extremity of the segments. Due to the squeezing or forcing action there is an upward thrust created which balances the transverse thrust exercised downwards upon the shaft $g$ owing to its weight and the parts which it may carry.

The number of the shoes may be other than six.

It should be understood that the invention claimed is not limited to the exact details of design and construction described herein, for obvious modifications will be apparent to one skilled in the art.

Having now particularly described and ascertained the nature of my invention and in what manner the same is to be performed, I declare that what I claim is:

1. In a thrust bearing, in combination, a thrust element having a continuous and unyielding rubbing surface, a cooperative thrust element divided into a plurality of shoes or sections having rubbing surfaces cooperative with that of said first thrust element and adapted to yield under the action of the load for the purpose of facilitating the introduction of oil between the cooperative rubbing surfaces, and a relatively unyielding supporting element for said shoes or sections, said shoes or sections being united to said supporting element by means of supporting columns.

2. In a thrust bearing, in combination, a thrust element having a continuous and unyielding rubbing surface, a cooperative thrust element divided into a plurality of sections having rubbing surfaces cooperative with that of said first thrust element, the body of said sections being individually flexible and adapted to deflect under the action of the load for the purpose of facilitating the introduction of oil between the cooperative rubbing surfaces, and an unyielding plate for supporting said sections, the latter being united to said plate by means of supporting columns.

3. In a thrust bearing, in combination, a thrust element having a continuous and unyielding rubbing surface, a cooperative second thrust element, said second thrust element being divided into a plurality of sections having rubbing surfaces cooperative with that of said first thrust element, the bodies of said sections being flexible at their leading edges and adapted to allow a deflection of each individual section under the action of the load, and an unyielding supporting plate, said sections all being united to said plate by means of supporting columns, the latter being also adapted to deflect under the action of the load, the same as the said sections, both deflections being for the purpose of facilitating the introduction of oil between the cooperative rubbing surfaces.

4. In a thrust bearing, in combination, a thrust element having a continuous unyielding rubbing surface, a cooperative thrust element divided into a plurality of sections having rubbing surfaces cooperative with that of said first thrust element and adapted to yield under the action of the load for the purpose of facilitating the introduction of oil between the cooperative rubbing surfaces, the said unyielding thrust element and the sections of said yielding thrust element having such shape or form as to be adapted to coact to laterally guide the shaft associated with said thrust bearing, and an unyielding supporting element, the sections of the yielding thrust element being carried by and united to said supporting element by means of supporting columns.

5. In a thrust bearing, in combination, a thrust element having a continuous and unyielding rubbing surface, a cooperative second thrust element divided into a plurality of sections having rubbing surfaces cooperative with that of said first thrust element and adapted to yield under the action of the load for the purpose of facilitating the introduction of oil between the cooperative rubbing surfaces, the said unyielding thrust element and the sections of said yielding thrust element having such shape and being provided with such surfaces as will be adapted to serve unaided for the lateral guiding of the shaft associated with the thrust bearing, and an unyielding supporting element, the sections of said yielding thrust element being supported by and united to said supporting element by means of supporting columns.

6. In a thrust bearing, in combination, a thrust element having a continuous and unyielding bearing surface, a cooperative second thrust element divided into a plurality of sections having bearing surfaces cooperative with that of said first thrust element and adapted to yield under the action of the load for the purpose of facilitating the introduction of oil between the cooperative bearing surfaces, the bearing surface of the unyielding thrust element and the bearing surfaces of the yielding thrust element being themselves adapted to secure the lateral guiding of the shaft associated with the thrust bearing, and a supporting element, the sections of said yielding thrust element being supported by and united to said supporting element by means of supporting columns.

7. In a thrust bearing, in combination, a thrust element having a continuous and unyielding bearing surface, a cooperative second thrust element divided into a plurality of sections having bearing surfaces cooperative with that of said first thrust element and adapted to yield under the action of the load for the purpose of facilitating the introduction of oil between the cooperative bearing surfaces, the bearing surface of the unyielding thrust element and the bearing surface of the sections of the yielding thrust element having the form of portions of spheres and being adapted to secure the lateral guiding of the shaft associated with the thrust bearing, and a supporting element, the sections of the yielding thrust element being supported by and united to said supporting element by means of supporting columns.

8. In a bearing, in combination, concentrically arranged elements having a region or regions of reduced bending strength, and a relatively rigid region or regions adjacent said reduced strength region or regions.

9. In a bearing, in combination, concentrically arranged elements having a region or regions of reduced bending strength, a relatively rigid region or regions adjacent said reduced region or regions, and supporting means for the bearing elements.

10. In a bearing element, a region or regions of reduced bending strength, in combination with an adjacent relatively rigid region or regions supporting the bearing element.

11. In a thrust bearing, a unitary member of annular form and divided into a series of sectors by transverse recesses in the bearing surface of said member, the leading edge of each of said sectors being individually adapted to yield with respect to the body portion of the sector.

12. In a thrust bearing, a member recessed transversely to provide a series of bearing sectors connected to each other and each sector having a portion at its leading edge which is deflectable with respect to the body portion of the sector.

13. In a thrust bearing, a plurality of sector-shaped bearing shoes connected together and having flexible projections at their leading edges.

14. In a thrust bearing, a bearing element comprising an annularly arranged series of circumferentially spaced bearing portions, each of said bearing portions having a bearing surface and a relatively flexible part, and means for supporting said series of bearing portions to permit flexure thereof in response to pressure of lubricating material between the bearing surfaces of said bearing portions and a co-operating element of the bearing.

15. In a thrust bearing, a bearing element comprising an annularly arranged series of bearing portions, each of said bearing portions having a bearing surface and a relatively flexible part, said bearing portions being relatively flexible at points adjacent their leading edges, and means for supporting said series of bearing portions to permit flexure thereof in response to pressure of lubricating material between the bearing surfaces of said bearing portions and a co-operating element of the bearing.

16. In a thrust bearing, a bearing element having a bearing surface and comprising a relatively rigid supporting portion, and a yieldable extension from said supporting portion, said extension being of reduced resistance to bending and deflectable through bending thereof during operation of the bearing to shift a portion of the bearing surface of the bearing element out of its normal position.

17. A thrust bearing member having a thrust surface and a yielding portion adapted to establish an oil film on the thrust surface, and means for supporting said member to prevent tilting thereof circumferentially of the axis of the bearing.

18. The combination of a bearing member comprising a plurality of sectors having flexible portions at their leading edges, and means to equalize the pressure on said sectors and thereby effect uniform lubrication.

19. The combination of a bearing member comprising a plurality of bearing sectors tiltably mounted on longitudinally-extending supporting means and provided with flexible portions at their leading edges, and an equalizing means for supporting said bearing member and uniformly distributing the pressure or load thereon.

20. The combination of a bearing member comprising a plurality of bearing sectors tiltably mounted on longitudinally-extending supporting means and provided with flexible portions at their leading edges, and a ball and socket support for said bearing member adapted to automatically equalize the thrust pressures thereon.

21. A thrust bearing member having transverse openings dividing the member into a series of sectors each of which is provided with a yielding portion at its leading edge.

22. A thrust bearing member having transverse openings dividing the member into a series of sectors connected to each other at adjacent ends and provided with yielding portions at their leading edges.

23. A thrust bearing comprising a plurality of connected sectors provided with flexible projections at their leading edges.

24. A bearing comprising one or more sectors provided with a yielding portion at their leading edges, and means for supporting said segments to prevent bodily tilting of the same in response to the wedging action of the lubricating fluid.

25. In combination in a thrust bearing, relatively movable bearing members having opposed cooperative bearing surfaces, one of said bearing members having a flexible portion at its bearing face, and yieldable means for supporting said latter bearing member.

26. In combination in a thrust bearing, relatively movable bearing members having opposed cooperative bearing surfaces, one of said bearing members being divided into a plurality of annularly arranged and connected sections each having a flexible portion at its bearing face, and yieldable means for supporting said latter bearing member.

27. In combination in a thrust bearing, relatively movable bearing surfaces, one of said bearing members being divided into a plurality of annularly arranged and connected sections each having a flexible portion at the leading edge of its bearing face, and yieldable means for supporting said latter bearing member.

28. In combination in a thrust bearing, relatively movable bearing members having opposed cooperative bearing surfaces, one of said bearing members being of annular form and having a supporting portion and a flexible portion overhanging said supporting portion and adapted to yield in response to a film of lubricating fluid under pressure between said flexible portion and the cooperative bearing member during operation of said bearing.

In testimony whereof I have affixed my signature.

EDMOND FULPIUS.